United States Patent
Kwon et al.

(10) Patent No.: US 9,991,549 B2
(45) Date of Patent: *Jun. 5, 2018

(54) ANODE FOR CABLE-TYPE SECONDARY BATTERY AND CABLE-TYPE SECONDARY BATTERY COMPRISING THE SAME

(71) Applicant: LG Chem, Ltd., Seoul (KR)

(72) Inventors: Yo-Han Kwon, Daejeon (KR);
Byung-Hun Oh, Daejeon (KR);
Je-Young Kim, Daejeon (KR);
Sang-Wook Woo, Daejeon (KR)

(73) Assignee: LG Chem, Ltd. (KR)

(*) Notice: Subject to any disclaimer, the term of this patent is extended or adjusted under 35 U.S.C. 154(b) by 182 days.

This patent is subject to a terminal disclaimer.

(21) Appl. No.: 14/749,131

(22) Filed: Jun. 24, 2015

(65) Prior Publication Data

US 2015/0295271 A1    Oct. 15, 2015

Related U.S. Application Data

(63) Continuation of application No. 14/260,416, filed on Apr. 24, 2014, now Pat. No. 9,099,747, which is a
(Continued)

(30) Foreign Application Priority Data

Aug. 30, 2012    (KR) .......................... 10-2012-0095670

(51) Int. Cl.
*H01M 4/75*    (2006.01)
*H01M 10/04*    (2006.01)
(Continued)

(52) U.S. Cl.
CPC ......... *H01M 10/0431* (2013.01); *H01M 4/02* (2013.01); *H01M 4/366* (2013.01);
(Continued)

(58) Field of Classification Search
None
See application file for complete search history.

(56) References Cited

U.S. PATENT DOCUMENTS

| | | |
|---|---|---|
| 4,522,897 A | 6/1985 | Walsh |
| 6,265,100 B1 | 7/2001 | Saaski et al. |

(Continued)

FOREIGN PATENT DOCUMENTS

| | | |
|---|---|---|
| EP | 2605314 A2 | 6/2013 |
| EP | 2772966 A1 | 9/2014 |

(Continued)

OTHER PUBLICATIONS

International Search Report for PCT/KR2013/007844 dated Nov. 8, 2013.
(Continued)

*Primary Examiner* — Wojciech Haske
(74) *Attorney, Agent, or Firm* — Lerner, David, Littenberg, Krumholz & Mentlik, LLP

(57) ABSTRACT

The present invention relates to an anode for a cable-type secondary battery, more specifically an anode for a cable-type secondary battery, comprising a spiral electrode consisting of at least two wire-type electrodes which are spirally twisted with each other, each of the wire-type electrodes comprising a wire-type current collector, an anode active material layer formed by coating on the outer surface of the wire-type current collector, and a polymer resin layer formed by coating on the outer surface of the anode active material layer; and a cable-type secondary battery comprising the anode. The anode for a cable-type secondary battery according to the present invention comprises a polymer resin layer formed by coating on the outer surface of an anode active material layer, thereby preventing the release of the anode active material layer from a wire-type current collec-
(Continued)

tor and eventually preventing the deterioration of battery performances.

13 Claims, 4 Drawing Sheets

Related U.S. Application Data continuation of application No. PCT/KR2013/007844, filed on Aug. 30, 2013.

(51) Int. Cl.

| | | |
|---|---|---|
| *H01M 4/02* | (2006.01) | |
| *H01M 4/62* | (2006.01) | |
| *H01M 4/36* | (2006.01) | |
| *H01M 4/78* | (2006.01) | |
| *H01M 4/38* | (2006.01) | |
| *H01M 4/40* | (2006.01) | |
| *H01M 4/42* | (2006.01) | |
| *H01M 4/44* | (2006.01) | |
| *H01M 4/46* | (2006.01) | |
| *H01M 4/485* | (2010.01) | |
| *H01M 4/505* | (2010.01) | |
| *H01M 4/525* | (2010.01) | |
| *H01M 4/58* | (2010.01) | |
| *H01M 4/583* | (2010.01) | |
| *H01M 4/66* | (2006.01) | |
| *H01M 10/0565* | (2010.01) | |

(52) U.S. Cl.
CPC ............ *H01M 4/38* (2013.01); *H01M 4/382* (2013.01); *H01M 4/386* (2013.01); *H01M 4/387* (2013.01); *H01M 4/405* (2013.01); *H01M 4/42* (2013.01); *H01M 4/44* (2013.01); *H01M 4/466* (2013.01); *H01M 4/485* (2013.01); *H01M 4/505* (2013.01); *H01M 4/525* (2013.01); *H01M 4/582* (2013.01); *H01M 4/583* (2013.01); *H01M 4/5825* (2013.01); *H01M 4/62* (2013.01); *H01M 4/622* (2013.01); *H01M 4/623* (2013.01); *H01M 4/625* (2013.01); *H01M 4/628* (2013.01); *H01M 4/663* (2013.01); *H01M 4/75* (2013.01); *H01M 4/78* (2013.01); *H01M 4/66* (2013.01); *H01M 4/661* (2013.01); *H01M 4/662* (2013.01); *H01M 4/669* (2013.01); *H01M 10/0422* (2013.01); *H01M 10/0565* (2013.01); *H01M 2004/025* (2013.01); *H01M 2004/027* (2013.01); *H01M 2220/20* (2013.01); *H01M 2220/30* (2013.01); *H01M 2300/0082* (2013.01); *H01M 2300/0085* (2013.01)

(56) References Cited

U.S. PATENT DOCUMENTS

| | | | |
|---|---|---|---|
| 2002/0018935 A1* | 2/2002 | Okada | H01M 4/0445 429/231.95 |
| 2005/0118508 A1 | 6/2005 | Yong et al. | |
| 2007/0224502 A1 | 9/2007 | Affinito et al. | |
| 2009/0311589 A1 | 12/2009 | Kim et al. | |
| 2010/0203372 A1 | 8/2010 | Kim et al. | |
| 2012/0058376 A1 | 3/2012 | Kwon et al. | |
| 2013/0149580 A1 | 6/2013 | Kim | |

FOREIGN PATENT DOCUMENTS

| | | | |
|---|---|---|---|
| JP | 2001110445 | A | 4/2001 |
| KR | 20070009231 | A | 1/2007 |
| KR | 20090009598 | | 1/2009 |
| KR | 20110089583 | A | 8/2011 |
| KR | 101072292 | B1 | 10/2011 |
| WO | 2012023774 | A2 | 2/2012 |

OTHER PUBLICATIONS

Yo Han Kwon et al., "Cable-Type Flexible Lithium Ion Battery Based on Hollow Multi-Helix Electrodes." Advanced Materials, vol. 24, No. 38, Aug. 7, 2012, pp. 5192-5197, XP055124961.
Search Report from European Application No. 13834163.1, dated Jan. 15, 2016.

\* cited by examiner

ANODE FOR CABLE-TYPE SECONDARY BATTERY AND CABLE-TYPE SECONDARY BATTERY COMPRISING THE SAME

CROSS-REFERENCE TO RELATED APPLICATIONS

The present application is a continuation of U.S. patent application Ser. No. 14/260,416 filed on Apr. 24, 2014, which is a continuation of International Application No. PCT/KR2013/007844 filed on Aug. 30, 2013, which claims priority from Korean Patent Application No. 10-2012-0095670 filed in the Republic of Korea on Aug. 30, 2012, all of which are incorporated herein by reference.

TECHNICAL FIELD

The present invention relates to an anode for a cable-type secondary battery, more specifically an anode for a cable-type secondary battery, which can prevent the release of an anode active material layer from a wire-type current collector, and a cable-type secondary battery comprising the anode.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop cable-type batteries having a very high ratio of length to cross-sectional diameter.

Particularly, when cable-type batteries comprise a spiral electrode consisting of at least two wire-type electrodes which are spirally twisted with each other, the spiral electrode has an increased surface area to react with Li ions during a charging and discharging process, thereby improving the rate characteristics of the battery.

However, if the wire-type electrodes are bent or twisted, an anode active material layer may be released from a wire-type current collector to deteriorate battery performances.

DISCLOSURE

Technical Problem

The present invention is designed to solve the above-mentioned problems, and therefore the present invention is directed to providing an anode for a cable-type secondary battery comprising a spiral electrode consisting of at least two wire-type electrodes which are spirally twisted with each other, each of the wire-type electrodes having an anode active material layer, specifically comprising a particle-shaped anode active material, conductive particles and a polymer binder, and a polymer resin layer formed on the outer surface of the anode active material layer, thereby preventing the release of the anode active material layer from a wire-type current collector; and a cable-type secondary battery comprising the anode.

Technical Solution

In accordance with one aspect of the present invention, there is provided an anode for a cable-type secondary battery, comprising a spiral electrode consisting of at least two wire-type electrodes which are spirally twisted with each other, each of the wire-type electrodes comprising a wire-type current collector, an anode active material layer formed by coating on the outer surface of the wire-type current collector, and a polymer resin layer formed by coating on the outer surface of the anode active material layer.

In the present invention, the wire-type current collector may be made of stainless steel, aluminum, nickel, titanium, sintered carbon, copper; stainless steel surface-treated with carbon, nickel, titanium or silver; an aluminum-cadmium alloy; non-conductive polymer surface-treated with a conductive material; or a conductive polymer.

The anode active material layer may comprise an anode active material, conductive particles and a polymer binder.

The anode active material which may be used in the present invention is any one selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; an alloy of the metals; an oxide (MeOx) of the metals; a complex of the metals and carbon; and a mixture thereof.

The conductive particles may be any one selected from the group consisting of carbon black, acetylene black, Ketjen black, carbon fiber, and a mixture thereof.

The polymer binder may be any one selected from the group consisting of polyvinylidene fluoride (PVDF), polyvinylidene fluoride-co-hexafluoro propylene (PVDF-HFP), polyvinylidene fluoride-co-trichloro ethylene, polymethyl methacrylate, polyethylene imine, polyvinylidene chloride, polybutylacrylate, polyacrylonitrile, poly-p-phenylene terephthalamide, polyvinylpyrrolidone, polyvinylacetate, polyimide, poly(ethylene-co-vinyl acetate), polyethylene oxide, polyarylate, cellulose acetate, cellulose acetate butyrate, cellulose acetate propionate, cyanoethylpullulan, cyanoethyl polyvinylalcohol, cyanoethylcellulose, cyanoethylsucrose, pullulan, styrene-butadiene rubber, carboxyl methyl cellulose, and a mixture thereof.

Also, the anode active material layer may have a thickness of 10 to 300 μm.

Meanwhile, the polymer resin layer may have a thickness of 10 nm to 100 μm.

The polymer resin layer may consist of a linear polymer or a cross-linked polymer.

The linear polymer which may be used in the present invention is any one selected from the group consisting of polyvinylidene fluoride (PVDF), polyvinylidene fluoride-co-hexafluoro propylene (PVDF-HFP), polyvinylidene fluoride-co-trichloro ethylene, polymethyl methacrylate, polyethylene imine, polyvinylidene chloride, polybutylacrylate, polyacrylonitrile, poly-p-phenylene terephthalamide, polyvinylpyrrolidone, polyvinylacetate, polyimide, poly(ethylene-co-vinyl acetate), polyethylene oxide, polyarylate, cellulose acetate, cellulose acetate butyrate, cellulose acetate propionate, cyanoethylpullulan, cyanoethyl polyvinylalcohol, cyanoethylcellulose, cyanoethylsucrose, pullulan, styrene-butadiene rubber, carboxyl methyl cellulose, and a mixture thereof.

Also, the cross-linked polymer may be a polymer of monomers having two or more functional groups, or a copolymer of monomers having two or more functional groups and polar monomers having one functional group.

The monomer having two or more functional groups, which may be used in the present invention, is any one selected from the group consisting of trimethylolpropane ethoxylate triacrylate, polyethylene glycol dimethacrylate, polyethyleneglycol diacrylate, divinylbenzene, polyesterdimethacrylate, divinylether, trimethylolpropane, trimethylolpropane trimethacrylate, ethoxylated bisphenol A dimethacrylate, and a mixture thereof.

The polar monomer having one functional group, which may be used in the present invention, is any one selected from the group consisting of methylmethacrylate, ethylmethacrylate, butylmethacrylate, methylacrylate, butylacrylate, ethylene glycol methylether acrylate, ethylene glycol methylether methacrylate, acrylonitrile, vinylacetate, vinylchloride, vinylfluoride and a mixture thereof.

In accordance with another aspect of the present invention, there is provided an anode for a cable-type secondary battery, comprising: a spiral electrode consisting of at least two wire-type electrodes which are spirally twisted with each other, each of the wire-type electrodes comprising a wire-type current collector and an anode active material layer formed by coating on the outer surface of the wire-type current collector; and a polymer resin layer formed by coating on the outer surface of the spiral electrode.

In accordance with still another aspect of the present invention, there is provided a cable-type secondary battery having a horizontal cross section of a predetermined shape and extending longitudinally, comprising: an anode comprising at least two spiral anodes which extend parallel to each other in the longitudinal direction; an electrolyte layer formed by filling to surround the anode, the electrolyte layer acting as an ion channel; a cathode having a cathode active material layer surrounding the outer surface of the electrolyte layer and a cathode current collector surrounding the outer surface of the cathode active material layer; and a protection coating surrounding the outer surface of the cathode, wherein the anode is as mentioned above.

The electrolyte layer may comprise an electrolyte selected from a gel polymer electrolyte using PEO, PVdF, PMMA, PAN, or PVAc; and a solid electrolyte using PEO, polypropylene oxide (PPO), polyether imine (PEI), polyethylene sulphide (PES), or polyvinyl acetate (PVAc).

Also, the electrolyte layer may further comprise a lithium salt.

The lithium salt may be any one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

The cathode active material layer may comprise an active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

The cathode current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

Further, in accordance with yet still another aspect of the present invention, there is provided a cable-type secondary battery having a horizontal cross section of a predetermined shape and extending longitudinally, comprising: a core for supplying lithium ions, which comprises an electrolyte; an anode surrounding the outer surface of the core for supplying lithium ions; a separation layer surrounding the outer surface of the anode, thereby preventing a short circuit between electrodes; a cathode having a cathode active material layer surrounding the outer surface of the separation layer and a cathode current collector formed to surround the outer surface of the cathode active material layer; and a protection coating surrounding the outer surface of the cathode, wherein the anode is as mentioned above.

In the present invention, the anode may be wound to spirally surround the outer surface of the core for supplying lithium ions, or may be arranged in parallel in the longitudinal direction along the outer surface of the core for supplying lithium ions.

The separation layer may be an electrolyte layer or a separator. The separator may be a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

Advantageous Effects

The anode of the present invention comprises a polymer resin layer formed by coating on the outer surface of an anode active material layer, thereby preventing the release of the anode active material layer from a wire-type current collector and eventually preventing the deterioration of battery performances.

DESCRIPTION OF DRAWINGS

The accompanying drawing illustrates a preferred embodiment of the present invention and, together with the foregoing disclosure, serves to provide further understanding of the technical spirit of the present invention. However, the present invention is not to be construed as being limited to the drawings.

BEST MODE

Figure 1:
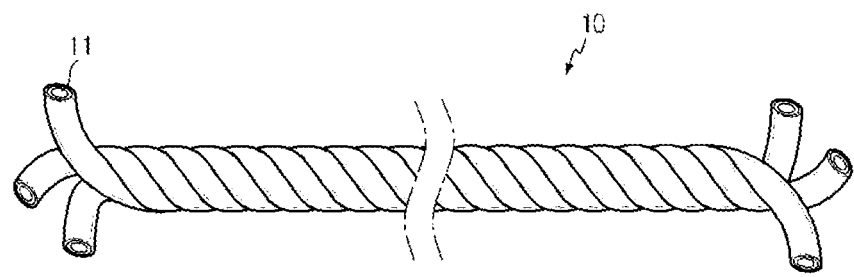
FIG. 1 is a perspective view schematically showing a spiral electrode consisting of three wire-type electrodes which are spirally twisted with each other, according to one embodiment of the present invention.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Also, the configurations illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

Figure 2:
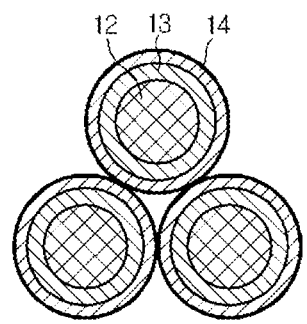
FIG. 2 is the cross-sectional view of FIG. 1.

FIG. 1 is a perspective view schematically showing a spiral electrode consisting of three wire-type electrodes which are spirally twisted with each other, according to one embodiment of the present invention, and FIG. 2 is the cross-sectional view of FIG. 1.

Referring to FIGS. 1 and 2, an anode for a cable-type secondary battery according to one aspect of the present invention comprises a spiral electrode 10 consisting of at least two wire-type electrodes 11 which are spirally twisted with each other, each of the wire-type electrodes comprising a wire-type current collector 12, an anode active material layer 13 formed by coating on the outer surface of the wire-type current collector 12, and a polymer resin layer 14 formed by coating on the outer surface of the anode active material layer. The anode active material layer 13 may comprise an anode active material, conductive particles and a polymer binder.

The anode active material layer may have a thickness of 10 to 300 μm. If an electrode has a high resistance due to its excessive thickness, the performances of batteries may be deteriorated. When such thickness range is satisfied, the electrical conductivity of an anode is obtained, which can provide the desired battery capacity, and thus the performances of batteries can be maintained without deterioration.

In the present invention, the anode active material which may be any one selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; an alloy of the metals; an oxide (MeOx) of the metals; a complex of the metals and carbon; and a mixture thereof.

Examples of the conductive particles include carbon black, acetylene black, Ketjen black and carbon fiber. Also, carbon having a high specific surface area may be used.

The polymer binder may be any one selected from the group consisting of polyvinylidene fluoride (PVDF), polyvinylidene fluoride-co-hexafluoro propylene (PVDF-HFP), polyvinylidene fluoride-co-trichloro ethylene, polymethyl methacrylate, polyethylene imine, polyvinylidene chloride, polybutylacrylate, polyacrylonitrile, poly-p-phenylene terephthalamide, polyvinylpyrrolidone, polyvinylacetate, polyimide, poly(ethylene-co-vinyl acetate), polyethylene oxide, polyarylate, cellulose acetate, cellulose acetate butyrate, cellulose acetate propionate, cyanoethylpullulan, cyanoethyl polyvinylalcohol, cyanoethylcellulose, cyanoethylsucrose, pullulan, styrene-butadiene rubber, carboxyl methyl cellulose, and a mixture thereof, but is not limited thereto.

Meanwhile, in conventional methods of preparing batteries by spirally twisting an anode which comprises a particle-shaped anode active material, conductive particles and a polymer binder, the active material layer of the anode may be released or peeled off from a current collector. Such a phenomenon is a limitation on the preparation of a spiral electrode.

Also, cable-type secondary batteries requiring flexibility are often affected by external impact due to their structural characteristics when the batteries are bent or folded. That is, the anode active material layer of the batteries may be peeled off from the current collector thereof to reduce capacity, deteriorate performances, and increase the possibility of a short current while the batteries are used. Particularly, the anode of the batteries may be subject to expansion or contraction during repeated charging and discharging processes, from which an anode active material may be released to deteriorate the performances of the batteries.

However, in accordance with one aspect of the present invention, the anode active material layer 13 is coated with the polymer resin layer 14 on the outer surface thereof, thereby preventing the release of the anode active material layer 13.

The polymer resin layer 14 can also absorb an electrolyte solution to ensure ionic conductivity, thereby preventing the increase of resistance within the battery.

Such a polymer resin layer 14 may consist of a linear polymer or a cross-linked polymer.

The linear polymer which may be used in the present invention is any one selected from the group consisting of polyvinylidene fluoride (PVDF), polyvinylidene fluoride-co-hexafluoro propylene (PVDF-HFP), polyvinylidene fluoride-co-trichloro ethylene, polymethyl methacrylate, polyethylene imine, polyvinylidene chloride, polybutylacrylate, polyacrylonitrile, poly-p-phenylene terephthalamide, polyvinylpyrrolidone, polyvinylacetate, polyimide, poly(ethylene-co-vinyl acetate), polyethylene oxide, polyarylate, cellulose acetate, cellulose acetate butyrate, cellulose acetate propionate, cyanoethylpullulan, cyanoethyl polyvinylalcohol, cyanoethylcellulose, cyanoethylsucrose, pullulan, styrene-butadiene rubber, carboxyl methyl cellulose, and a mixture thereof, but is not limited thereto.

Also, the cross-linked polymer may be a polymer of monomers having two or more functional groups, or a copolymer of monomers having two or more functional groups and polar monomers having one functional group.

The monomer having two or more functional groups, which may be used in the present invention, is any one selected from the group consisting of trimethylolpropane ethoxylate triacrylate, polyethylene glycol dimethacrylate, polyethyleneglycol diacrylate, divinylbenzene, polyesterdimethacrylate, divinylether, trimethylolpropane, trimethylolpropane trimethacrylate, ethoxylated bisphenol A dimethacrylate, and a mixture thereof, but is not limited thereto.

The polar monomer having one functional group, which may be used in the present invention, is any one selected from the group consisting of methylmethacrylate, ethylmethacrylate, butylmethacrylate, methylacrylate, butylacrylate, ethylene glycol methylether acrylate, ethylene glycol methylether methacrylate, acrylonitrile, vinylacetate, vinylchloride, vinylfluoride and a mixture thereof, but is not limited thereto.

The polymer resin layer 14 is not limited to its thickness, but may have a thickness of 1 nm to 500 μm, preferably 10 nm to 100 μm. When such a thickness range is satisfied, even if the wire-type electrode is affected by stress from its bending or external physical force, or the anode itself is subject to expansion or contraction during charging and discharging, the release of the anode active material layer can be effectively prevented and the increase of resistance within the battery can be inhibited. From this, the charging and discharging performances of the cable-type secondary battery can be maintained, the flexibility thereof and any other performances can be suitably obtained.

The wire-type current collector 11, which is used in the anode for a cable-type secondary battery according to one embodiment of the present invention, may be made of stainless steel, aluminum, nickel, titanium, sintered carbon, copper; stainless steel surface-treated with carbon, nickel, titanium or silver; an aluminum-cadmium alloy; non-conductive polymer surface-treated with a conductive material; or a conductive polymer.

The current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), copper, silver, palladium, nickel, etc. The conductive polymer may be selected from polyacetylene, polyaniline, polypyrrole, polythiophene, polysulfurnitride, and a mixture thereof. However, the non-conductive polymer used in the current collector is not particularly limited to its kinds.

Figure 3:
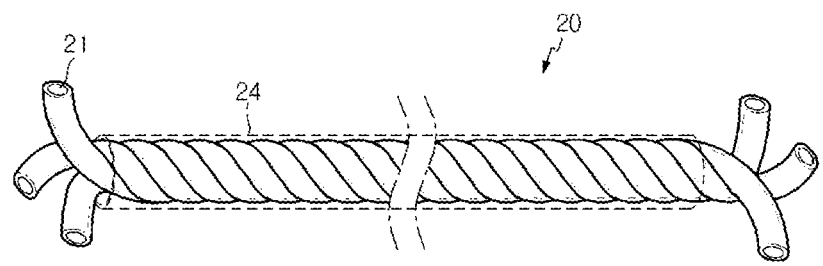
FIG. 3 is a perspective view schematically showing a spiral electrode consisting of three wire-type electrodes which are spirally twisted with each other, according to another embodiment of the present invention.
Figure 4:
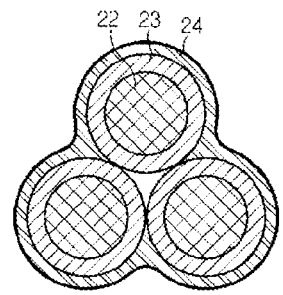
FIG. 4 is the cross-sectional view of FIG. 3.

Meanwhile, FIG. 3 is a perspective view schematically showing a spiral electrode consisting of three wire-type electrodes which are spirally twisted with each other, according to another embodiment of the present invention, and FIG. 4 is the cross-sectional view of FIG. 3.

Referring to FIGS. 3 and 4, an anode for a cable-type secondary battery according to another aspect of the present invention comprises a spiral electrode 20 consisting of at least two wire-type electrodes 21 which are spirally twisted with each other, each of the wire-type electrodes comprising a wire-type current collector and an anode active material layer 23 formed by coating on the outer surface of the wire-type current collector 22; and a polymer resin layer 24 formed by coating on the outer surface of the spiral electrode 20.

Although the polymer resin layer 24 is coated on the outer surface of the spiral electrode 20, it can prevent the release of the anode active material layer 23 and the deterioration of battery performances as mentioned above.

Figure 5:
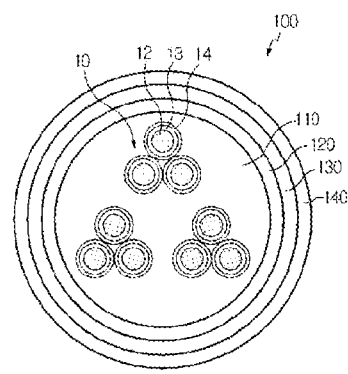
FIG. 5 is a cross-sectional view showing a cable-type secondary battery according to one embodiment of the present invention.

FIG. 5 is a cross-sectional view showing a cable-type secondary battery according to one embodiment of the present invention.

Referring to FIG. 5, a cable-type secondary battery according to one aspect of the present invention has a horizontal cross section of a predetermined shape and extending longitudinally, and comprises an anode comprising at least two spiral anodes 10 which extend parallel to each other in the longitudinal direction; an electrolyte layer 110 formed by filling to surround the anode, the electrolyte layer acting as an ion channel; a cathode having a cathode active material layer 120 surrounding the outer surface of the electrolyte layer and a cathode current collector 130 surrounding the outer surface of the cathode active material layer 120; and a protection coating 140 surrounding the outer surface of the cathode, wherein the anode is as mentioned above. The term 'a predetermined shape' used herein refers to not being particularly limited to any shape, and means that any shape that does not damage the nature of the present invention is possible.

The cable-type secondary battery of the present invention has a horizontal cross section of a predetermined shape, a linear structure, which extends in the longitudinal direction, and flexibility, so it can freely change in shape.

The electrolyte layer 110 used in the present invention may comprise an electrolyte selected from a gel polymer electrolyte using PEO, PVdF, PMMA, PAN, or PVAc; and a solid electrolyte of PEO, polypropylene oxide (PPO), polyether imine (PEI), polyethylene sulphide (PES), or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve poor mechanical properties. The electrolyte layer of the present invention can serve as a separator, and thus an additional separator may be omitted.

In addition, the electrolyte layer 110 may further comprise a lithium salt. Non-limiting examples of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate.

The cathode active material layer 120 may comprise an active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which 0≤x<0.5, 0≤y<0.5, 0≤z<0.5, and x+y+z≤1), and a mixture thereof.

The cathode current collector 130 is not particularly limited to its forms, but is preferably in the form of a pipe, a wound wire or a mesh. Also, the cathode current collector 130 may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

Also, the cable-type secondary battery of the present invention has a protection coating 140 as the outermost layer. The protection coating is an insulator and is formed on the outer surface of the cathode current collector 230, thereby protecting the electrodes against moisture in the air and external impacts. The protection coating may be made of conventional polymer resins, for example, PVC, HDPE or epoxy resins.

Figure 6:
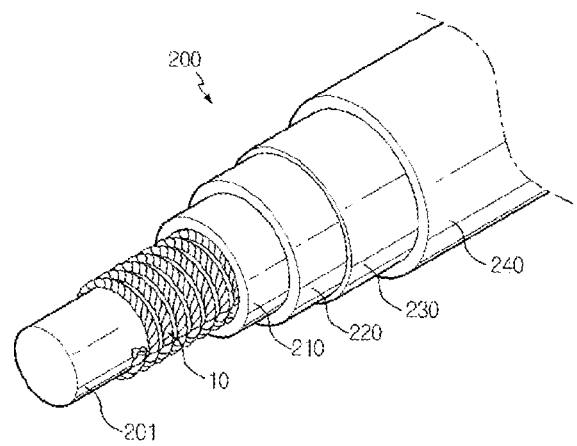
FIG. 6 is a perspective view showing a cable-type secondary battery, comprising an anode having one spiral electrode wound thereon, according to another embodiment of the present invention.
Figure 7:
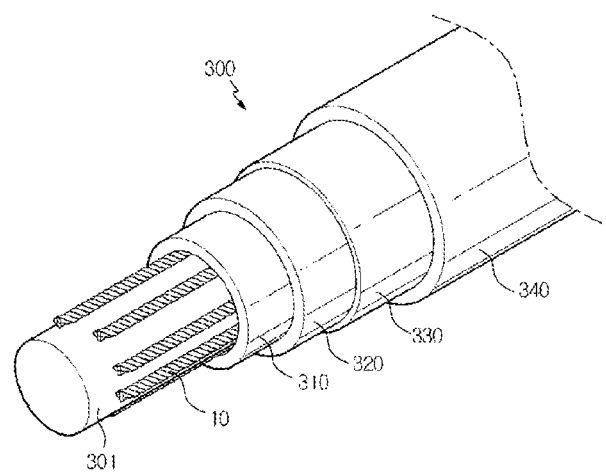
FIG. 7 is a perspective view showing a cable-type secondary battery, comprising an anode having multiple spiral electrodes arranged in parallel in the longitudinal direction, according to still another embodiment of the present invention.

FIG. 6 is a perspective view showing a cable-type secondary battery, comprising an anode having one spiral electrode wound thereon, according to another embodiment of the present invention, and FIG. 7 is a perspective view showing a cable-type secondary battery, comprising an anode having multiple spiral electrodes arranged in parallel in the longitudinal direction, according to still another embodiment of the present invention.

Referring to FIGS. 6 and 7, cable-type secondary batteries according to one aspect of the present invention have a horizontal cross section of a predetermined shape and extending longitudinally, and comprise a core 201, 301 for supplying lithium ions, which comprises an electrolyte; an anode surrounding the outer surface of the core 201, 301 for supplying lithium ions; a separation layer 210, 310 surrounding the outer surface of the anode, thereby preventing a short circuit between electrodes; a cathode having a cathode active material layer 220, 320 surrounding the outer surface of the separation layer 210, 310 and a cathode current collector 230, 330 formed to surround the outer surface of the cathode active material layer 220, 320; and a protection coating 240, 340 surrounding the outer surface of the cathode, wherein the anode is as mentioned above.

In the present invention, the anode may be wound to spirally surround the outer surface of the core for supplying lithium ions as shown in FIG. 6, or may be arranged in parallel in the longitudinal direction along the outer surface of the core for supplying lithium ions, as shown in FIG. 7.

Also, the separation layer 210, 310 may be an electrolyte layer or a separator. The separator may be a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer. Among these, in order for the lithium ions of the core for supplying lithium ions to be transferred to the cathode, it is preferred to use a non-woven fabric separator corresponding to the porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes.

Hereinafter, the present invention will be described in detail through specific examples. However, the description proposed herein is just a preferable example for the purpose of illustrations only, not intended to limit the scope of the invention, so it should be understood that the examples are provided for a better explanation to an ordinary person skilled in the art.

Example 1

A mixture of natural graphite/acetylene black/PVDF (70/5/25) was added to N-methylpyrrolidone (NMP) used as a solvent to obtain a slurry of an anode active material. The slurry was coated on the surface of a wire-type Cu current collector having a diameter of 125 μm to form an anode active material layer.

Then, the current collector having the anode active material layer formed thereon was dipped in a mixed solution of PVDF-HFP/acetone (5/95) for coating to form a polymer resin layer in a thickness of 10 μm on the current collector. Thereby, a wire-type electrode having a polymer resin layer formed thereon was prepared.

Example 2

A lithium foil was used as a cathode, and the wire-type electrode prepared in Example 1 was made in a coil form like mosquito coils and used as an anode. A polyethylene separation film was interposed between the anode and the cathode to obtain an electrode assembly.

Then, the electrode assembly was put in a battery case. Thereto, 1M LiPF$_6$ of non-aqueous electrolyte solution obtained by adding LiPF$_6$ to a non-aqueous solvent of ethylene carbonate and diethyl carbonate (1/2 vol/vol %) was introduced, to prepare a coin-type half-cell.

Comparative Example 1

The procedures of Example 1 were repeated except that the polymer resin layer was not formed, to prepare a wire-type electrode.

Comparative Example 2

A mixture of natural graphite/acetylene black/PVDF (70/5/25) was added to N-methylpyrrolidone (NMP) used as a solvent to obtain a slurry of an anode active material. The slurry was coated on a Cu foil to prepare a film-type electrode.

Comparative Example 3

The procedures of Example 2 were repeated except that the film-type electrode prepared in Comparative Example 2 was used as an anode, to prepare a coin-type half-cell.

Experimental Example 1: Evaluation for Electrode Release

The wire-type electrodes prepared in Example 1 and Comparative Example 1 were each wound in a cylindrical bar having a diameter of 1.5 mm, and a degree to which each anode active layer was released was observed for comparison.

Figure 8:
FIG. 8 is a photograph of a wire-type anode according to an Example of the present invention.
Figure 9:
FIG. 9 is a photograph of a wire-type anode according to a Comparative Example of the present invention.

As shown in FIG. 8, the wire-type electrode of Example 1 was not subject to any release. In contrast, as shown in FIG. 9, the wire-type electrode of Comparative Example 1 was subject to partial release.

Experimental Example 2: Evaluation for Battery Performances

The coin-type half-cells prepared in Example 2 and Comparative Example 3 were evaluated for their charge/discharge characteristics.

Charging was conducted with a constant current of 0.1 c up to 5 mV at constant current and then maintained with a constant voltage of 5 mV, and the charging was completed when a current density reached 0.005 C. Discharging was conducted with a constant current of 0.1 c up to 1 V at constant current. Such a charging/discharging procedure was repeated 30 times under the same conditions.

Figure 10:
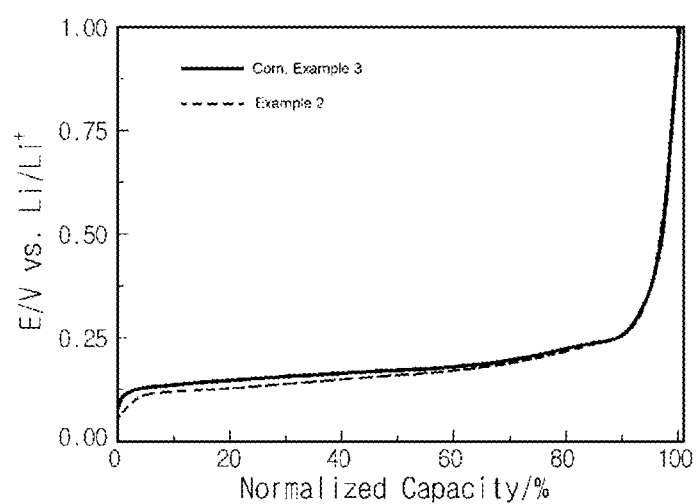
FIG. 10 is a graph showing the results of the performance test for coin-type half-cells prepared in Example 2 and Comparative Example 3.

FIG. 10 is a graph showing the results of the performance test for coin-type half-cells prepared in Example 2 and Comparative Example 3.

In the coin-type half-cell having a polymer resin layer which was prepared in Example 2, resistance increase did not occur within the cell, and also battery performances were confirmed to be equivalent to those of the coin-type half-cell prepared in Comparative Example 3 which corresponds to a conventional battery.

Meanwhile, the configurations illustrated in the drawings and the embodiments herein are just preferable examples for the purpose of better understanding of the present invention, not intended to limit the scope of the disclosure. Accordingly, it is apparent to a person having ordinary skill in the art that other equivalents and modifications could be made thereto without departing from the spirit and scope of the disclosure.

What is claimed is:

1. A cable-type secondary battery having a horizontal cross section of a predetermined shape and extending longitudinally, comprising:
    an anode comprising at least two spiral anodes which extend parallel to each other in the longitudinal direction, each spiral anode consisting of at least two wire-type electrodes which are spirally twisted with each other, each of the wire-type electrodes comprising a wire-type current collector, an anode active material layer formed by coating on the outer surface of the wire-type current collector, and a polymer resin layer formed by coating on the outer surface of the anode active material layer,
    wherein the polymer resin layer consists of a linear polymer selected from the group consisting of polyvinylidene chloride, polybutylacrylate, poly-p-phenylene terephthalamide, polyvinylpyrrolidone, poly (ethylene-co-vinyl acetate), polyarylate, cellulose acetate, cellulose acetate butyrate, cellulose acetate propionate, cyanoethylpullulan, cyanoethyl polyvinylalcohol, cyanoethylcellulose, cyanoethylsucrose, pullulan, styrene-butadiene rubber, carboxyl methyl cellulose and a mixture thereof, and
    wherein the polymer resin layer coated on the outer surface of the anode active material layer prevents the release of the anode active layer from the wire-type current collector,
    an electrolyte layer formed by filling to surround the anode, the electrolyte layer acting as an ion channel;
    a cathode having a cathode active material layer surrounding the outer surface of the electrolyte layer and a cathode current collector surrounding the outer surface of the cathode active material layer; and
    a protection coating surrounding the outer surface of the cathode,
    wherein the electrolyte layer is a single undivided volume that fills a space between outer surfaces of the polymer resin layers of each of the wire-type electrodes and an inner surface of the cathode active material layer.

2. The cable-type secondary battery according to claim 1, wherein the wire-type current collector is made of stainless steel, aluminum, nickel, titanium, sintered carbon, copper; stainless steel surface-treated with carbon, nickel, titanium or silver; an aluminum-cadmium alloy; non-conductive polymer surface-treated with a conductive material; or a conductive polymer.

3. The cable-type secondary battery according to claim 1, wherein the anode active material layer comprises an anode active material, conductive particles and a polymer binder.

4. The cable-type secondary battery according to claim 3, wherein the anode active material is selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; an alloy of the metals; an oxide (MeOx) of the metals; a complex of the metals and carbon; and a mixture thereof.

5. The cable-type secondary battery according to claim 3, wherein the conductive particles is selected from the group consisting of carbon black, acetylene black, Ketjen black, carbon fiber and a mixture thereof.

6. The cable-type secondary battery according to claim 3, wherein the polymer binder is selected from the group consisting of polyvinylidene fluoride (PVDF), polyvinylidene fluoride-co-hexafluoro propylene (PVDF-HFP), polyvinylidene fluoride-co-trichloro ethylene, polymethyl methacrylate, polyethylene imine, polyvinylidene chloride, polybutylacrylate, polyacrylonitrile, poly-p-phenylene terephthalamide, polyvinylpyrrolidone, polyvinylacetate, polyimide, poly(ethylene-co-vinyl acetate), polyethylene oxide, polyarylate, cellulose acetate, cellulose acetate butyrate, cellulose acetate propionate, cyanoethylpullulan, cyanoethyl polyvinylalcohol, cyanoethylcellulose, cyanoethylsucrose, pullulan, styrene-butadiene rubber, carboxyl methyl cellulose and a mixture thereof.

7. The cable-type secondary battery according to claim 1, wherein the anode active material layer has a thickness of 10 to 300 μm.

8. The cable-type secondary battery according to claim 1, wherein the polymer resin layer has a thickness of 10 nm to 100 μm.

9. The cable-type secondary battery according to claim 1, wherein the electrolyte layer comprises an electrolyte selected from a gel polymer electrolyte using PEO, PVdF, PMMA, PAN, or PVAc; and a solid electrolyte using PEO, polypropylene oxide (PPO), polyether imine (PEI), polyethylene sulphide (PES), or polyvinyl acetate (PVAc).

10. The cable-type secondary battery according to claim 1, wherein the electrolyte layer further comprises a lithium salt.

11. The cable-type secondary battery according to claim 10, wherein the lithium salt is selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate and a mixture thereof.

12. The cable-type secondary battery according to claim 1, wherein the cathode active material layer comprises an active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M$_1$ and M$_2$ are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

13. The cable-type secondary battery according to claim 1, wherein the cathode current collector is made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

* * * * *